Nov. 19, 1935.  H. J. GALEY  2,021,180
FORM FOR BENDING GLASS
Filed Jan. 26, 1934   2 Sheets-Sheet 1

INVENTOR
HENRY J. GALEY.
BY
ATTORNEYS.

Nov. 19, 1935.　　　　　H. J. GALEY　　　　　2,021,180
FORM FOR BENDING GLASS
Filed Jan. 26, 1934　　　　2 Sheets-Sheet 2

INVENTOR
HENRY J. GALEY
BY
Bradley & Bee
ATTORNEYS.

Patented Nov. 19, 1935

2,021,180

UNITED STATES PATENT OFFICE 2,021,180

FORM FOR BENDING GLASS

Henry J. Galey, Tarentum, Pa., assignor to Pittsburgh Plate Glass Company, a corporation of Pennsylvania Application January 26 1934, Serial No. 708,441

2 Claims. (Cl. 49—67)

Figure 1:
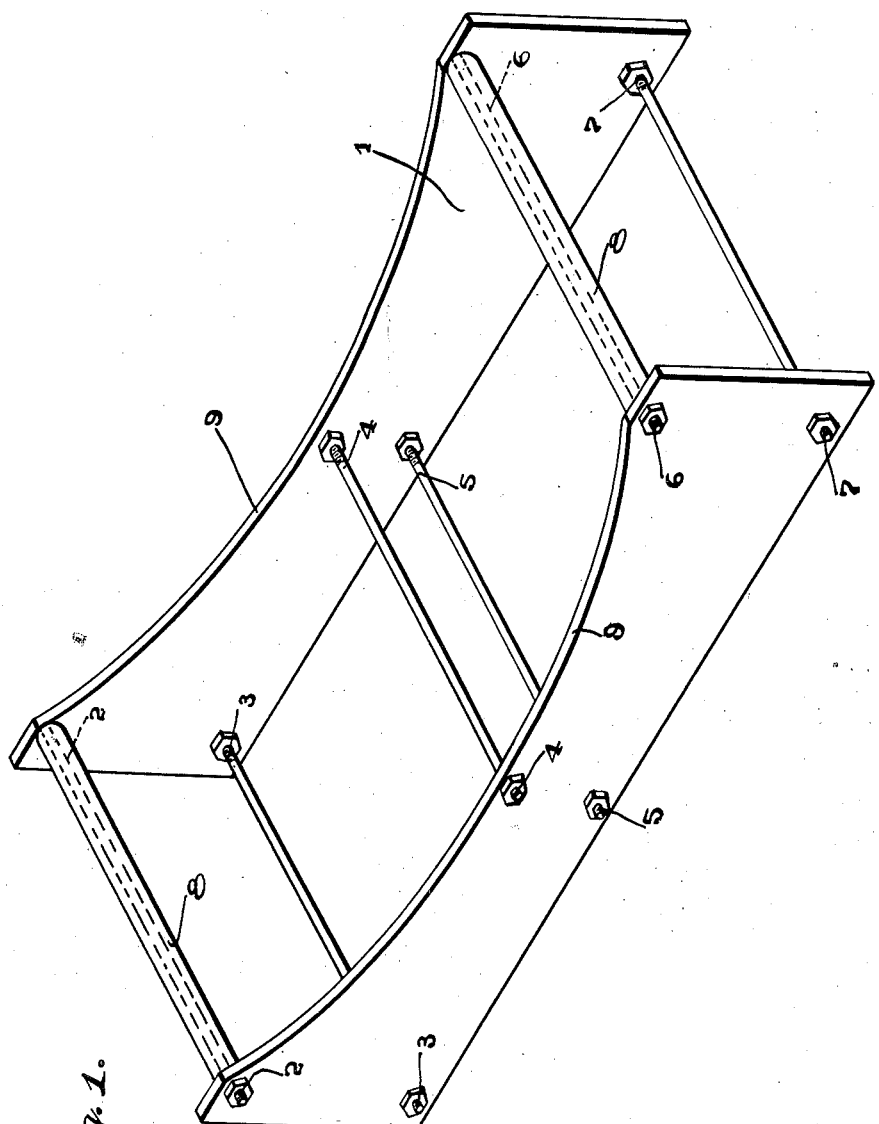
Figure 2:
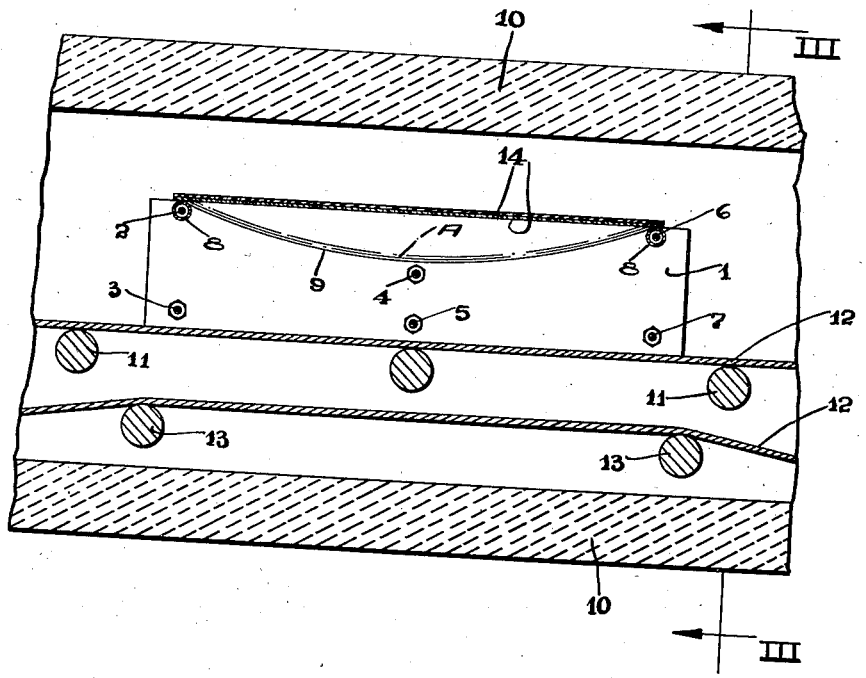
Figure 3:
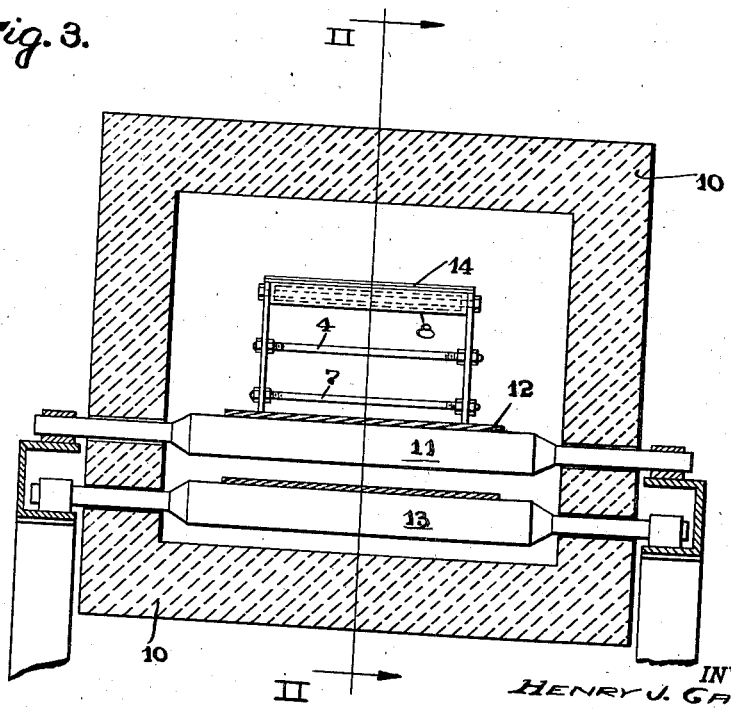

The invention relates to a form for use in bending glass plates or sheets and has for its objects the provision of a very cheap simple form which will not distort in handling and in which the curvature of the surfaces coming in contact with the glass plates will not be changed when the device is subject to the high temperatures necessary in carrying out the bending operation. The invention is illustrated in the accompanying drawings, wherein:

Figure 1 is an isometric view of the form or mold. Fig. 2 is a longitudinal section through a tunnel kiln or leer showing the method of carrying the form therethrough, such section being taken on the line II—II of Fig. 3. And Fig. 3 is a section on the line III—III of Fig. 2.

Referring to the drawings, the mold or form is made up of a pair of sheet metal plates 1, 1, secured together by means of the tie bars 2, 3, 4, 5, 6 and 7, the bars 3, 4, 5 and 7 each being provided with a nut on each side of each of the plates so that the plates are properly spaced and securely held in proper relative position. The tie bars 2 and 6 are each provided with a spacer in the form of a pipe 8 whose upper periphery is in line with the curved upper edges 9, 9 of the plates. These spacers act as supports for the ends of the glass sheets which are bent upon the form. The plates 1, 1 are preferably made of sheet steel, although any suitable metal may be used. In some cases, it may be found desirable to use metal composition having high temperature resistance although ordinary sheet steel will stand up for a long period of time under the temperatures to which the form is exposed in the bending operation.

The tunnel kiln or leer in which the glass sheets are bent may be of any approved form, suitably heated and provided with a conveyor for carrying the forms in series therethrough. As illustrated, the leer comprises a casing or wall 10 of refractory material provided with a series of spaced rollers 11, around which an endless conveyor 12 extends. This conveyor is preferably in the form of a woven wire belt suitably driven and supported in its return flight upon the rollers 13. The use of this wire belt permits the rolls 11 to be spaced relatively wide distances. The belt may be dispensed with if the rollers 11 are spaced relatively close together.

In bending the glass sheets, two sheets are preferably bent at the same time, one sheet being imposed upon the other, as indicated by the numerals 14, 14. In the bending operation, the form with the glass sheets thereon is exposed in the kiln or leer to a temperature sufficient to soften the glass sheets and cause them to settle down on to the curved surfaces 9, 9 of the plates 1, 1, as indicated at A in dotted lines in Fig. 2. This softening and bending of the glass sheets will occur at a temperature of approximately 1000 deg. F., and at such temperatures, the glass is not marred where it contacts with the surfaces 9, 9 of the plates 1, 1. After the glass has been heated so that it bends down and fits the form, the form with the glass thereon is carried through a zone in the kiln of gradually decreasing temperature, finally at a temperature at which the glass plates may be removed from the form and handled without inconvenience.

The form is of relatively light, cheap construction and will not distort readily in handling, but its primary advantage lies in the fact that the surfaces 9, 9 are not changed in curvature during the passage of the form through the kiln. This is due to the fact that the plates 1, 1 connected only by the relatively light tie bars, are free to contract and expand without interference the one with the other and are of uniform thickness throughout. Under these conditions, there is no tendency for the plates to be deformed due to the high temperatures to which the apparatus is exposed. There is also no tendency of the edges 9, 9 to sag during the heating operation, as is the case where the curved members governing the contour of the glass are made of rods or bars. The plates are preferably spaced so that the edges 9, 9 engage the glass sheet which is being bent either at the extreme side edges thereof or close to such side edges, but this is not necessarily the case since the bending occurs at a temperature sufficiently low to prevent marring of the glass where it contacts with the metal plates. With very wide glass sheets, any tendency to sag between the side plates 1, 1 may be avoided by the use of an additional plate or plates lying between the side plates 1, 1 and having the upper edge or edges thereof curved similarly to those of the upper edges of the plates 1, 1. The curvature of the plates 1, 1 illustrated may be widely varied depending upon requirements.

What I claim is:

1. A skeleton form for use in bending a glass sheet comprising a pair of spaced metal plates, having their upper edges similarly curved to the contour to which the glass sheet is to be bent, spaced apart a distance less than the width of the glass sheet to be bent and adapted to engage the lower surface of the glass sheet adjacent its side edges, and transverse relatively light tie rods securing the plates together and maintaining them in spaced relation but leaving them free to expand in all directions independently of each other.

2. A skeleton form for use in bending a glass sheet comprising a pair of spaced metal plates, having their upper edges similarly curved to the contour to which the glass sheet is to be bent, spaced apart a distance less than the width of the glass sheet to be bent and adapted to engage the lower surface of the glass sheet adjacent its side edges, and transverse relatively light tie rods securing the plates together and maintaining them in spaced relation but leaving them free to expand in all directions independently of each other, one of such rods being located at each end of the plates and positioned so that they will support the glass sheet at its end on a line which is in alignment with the curved edges of the plates.

HENRY J. GALEY.